April 12, 1966     H. F. MATARÉ ETAL     3,246,161
SEMI-CONDUCTOR PHOTOPOTENTIOMETER
Filed Aug. 6, 1962     2 Sheets-Sheet 1

INVENTORS,
HERBERT F. MATARÉ
BY THOMAS E. THOMPSON

*Richard J. Seeger*
ATTORNEY

April 12, 1966  H. F. MATARÉ ETAL  3,246,161
SEMI-CONDUCTOR PHOTOPOTENTIOMETER
Filed Aug. 6, 1962  2 Sheets-Sheet 2
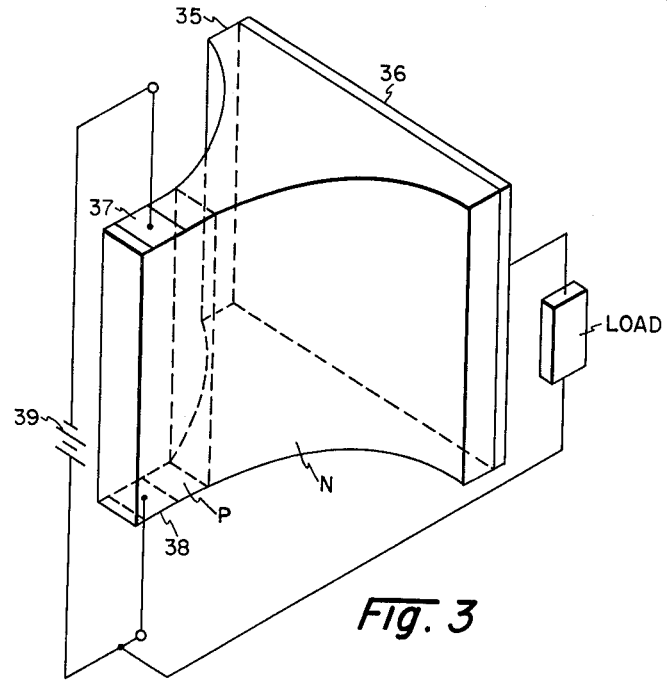
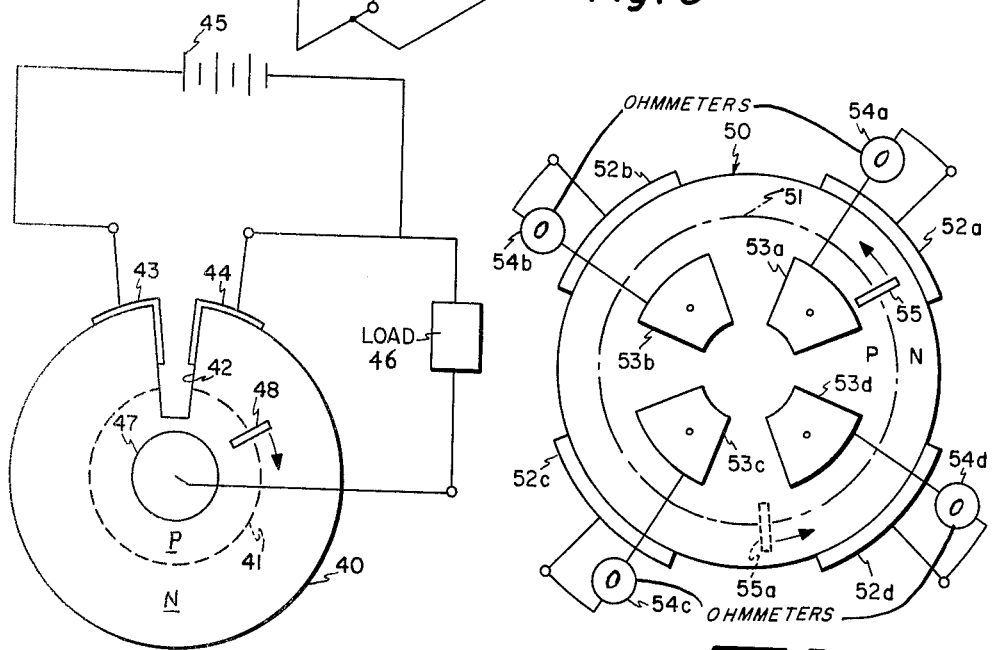
INVENTORS,
HERBERT F. MATARÉ
THOMAS E. THOMPSON
BY
Richard T. Seeger
ATTORNEY

United States Patent Office 3,246,161
Patented Apr. 12, 1966

3,246,161
SEMI-CONDUCTOR PHOTOPOTENTIOMETER
Herbert F. Mataré, Birmingham, and Thomas E. Thompson, Rochester, Mich., assignors to The Bendix Corporation, Southfield, Mich., a corporation of Delaware
Filed Aug. 6, 1962, Ser. No. 215,110
7 Claims. (Cl. 250—211)

This invention pertains to a semi-conductor photopotentiometer which is a potentiometer that changes its output is proportion to the position of a moving light spot or beam, on the semi-conductor body.

A photopotentiometer of the prior art, known as the Giannini photopotentiometer, has a layer of cadmium sulfide having a resistance strip on one side and a conducting layer on the other. By moving a light spot lengthwise of the three layers, the resistance across the several layers is changed in proportion to the longitudinal position of the light spot. This type of photopotentiometer has not been entirely satisfactory because: the absolute amount of internal resistance of cadmium sulfide, or light-pass resistance, lowers the efficiency of the device; nonlinearity is present due to the nature of the resistance of the conducting layer of cadmium sulfide; it is difficult to place a uniform resistance layer on the cadmium sulfide semi-conductor body; the amount of light needed is relatively high; and incorporation in microminiaturized silicon devices is not possible.

This invention improves upon the former devices by using a semi-conductor body of germanium or preferably silicon, with a PN junction which can be dimensioned so that the resistance of the semi-conductor body itself is used to act as the resistance strip along which a potential gradient is developed by placing a battery thereacross. A light beam is then moved lengthwise of the junction changing the output of the cell. Due to the nature of the semi-conductor materials, such as germanium and silicon, usable in this device of this invention, greater efficiency, and speed, are possible.

These and other advantages and objects will become more apparent when preferred embodiments are considered in connection with the drawings in which:

FIGURE 3 is a schematic perspective view of a second embodiment of this invention having enlarged portion for a contact surface;

FIGURE 4 is a schematic view of a further embodiment of this invention which is circular in configuration having the advantage of a smaller area for a given length junction;

FIGURE 5 is a schematic view of embodiment which can accurately locate or indicate the light spot position along the junction.

Figure 1:
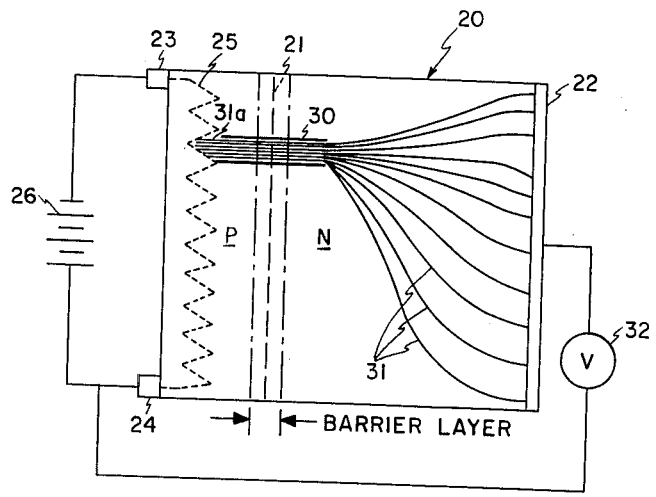
FIGURE 1 is a schematic elevational view of a first embodiment of this invention.

In this embodiment of FIGURE 1 is shown a semi-conductor body 20 which may be of germanium or silicon material, and which has a P type doping, such as boron, in the P section and N type doping, such as arsenic, in the N section. A junction 21 is formed between the P and N sections and a voltage barrier is formed therealong which prevents the holes in the P section from crossing into the N section and likewise prevents the electrons in the N section from crossing into the P section.

A conductive coating 22 is plated or otherwise formed at the "plated" end of semi-conductor body 20 and a pair of conductive surfaces 23 and 24 are formed at the "resitive" end of semi-conductor body 20. Body 20 is proportioned to provide a predetermined resistance between the contacts 23 and 24. For example, if the body 20 has a resistivity of 100 ohm centimeters, and the area between junction 21 and contact 23 is about .001 square centimeters, a resistance in the neighborhood of 100,000 ohms is obtainable between contacts 23 and 24 for each centimeter of length.

A battery 26 is connected between contacts 23 and 24 which has its negative pole connected to contact 23 and its positive pole connected to contact 24 providing a drop across the semi-conductor resistance, shown schematically by the dotted line 25. Layer 22 is formed on the N section of body 20. The output is connected between conductive coating 22 and the positive terminal of battery 26, in order to put a reverse bias across the junction 21. If layer 22 were formed on the P section of body 22, it would be connected to the negative terminal of the battery 26.

A bar of light 30 from a suitable source, not shown, is movable vertically along junction 21 and is shown in an upper position. The wavelength of light 30 should be matched with the material along junction 21 so that there is a maximum transfer of light energy to electron energy. In the case of germanium, light rays having frequencies in the near infrared radiation portion are suitable to cause the electron excitement which breaks the electron-hole pairs at the junction thereby lowering the voltage barriers to effectively short circuit that area of the junction which is illuminated. Body 20 at the junction 21 should be thin enough so that the light 30 can fully penetrate for maximum efficiency. For most semi-conductor materials this thickness is in the neighborhood of one centimeter or less.

Electric field lines 31 are established which represent essentially the paths that the carriers will take when potential is applied and as indicated, the carriers will cross junction 21 at that point where it is illuminated by light beam 30. The lines 31 are concentrated at 31A due to the high lateral resistance and strike the resistive portion or end of body 20 between contacts 23 and 24 at a point depending on the location of light beam 30. By moving light beam 30 downwardly, the concentration of lines 31 will also be moved downwardly lowering the output voltage which is detected by voltmeter 32.

Figure 2:
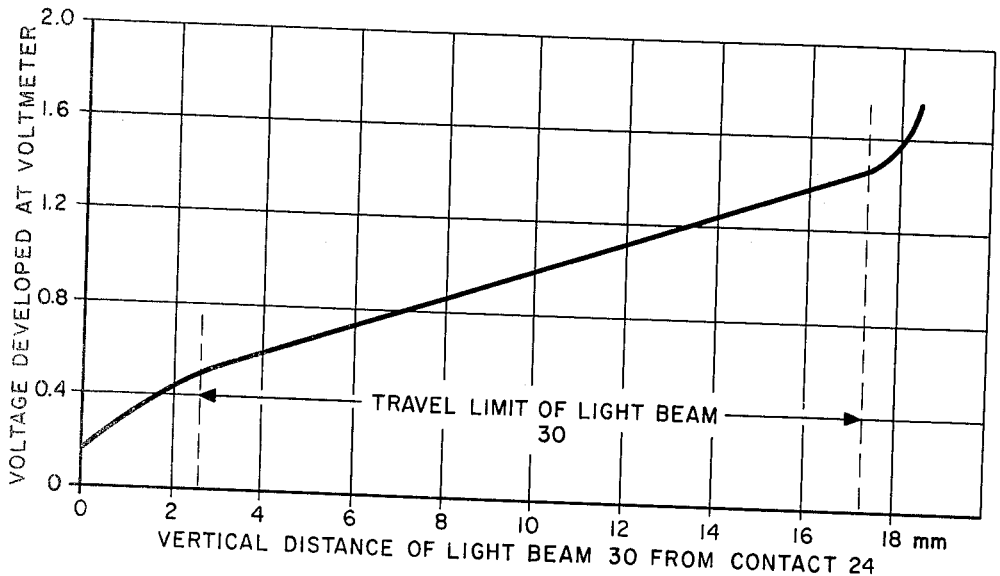
FIGURE 2 is a graph showing along the ordinate the voltage output and along the abscissa the travel of the light spot along the junction.

This is shown in FIGURE 2 where the reading of voltmeter 32 is shown along the ordinate and a placement of light beam 30 from contact 23 is shown along the abscissa.

For this test, the distance between contacts 23 and 24 was 18.5 millimeters. The voltage of battery 26 in this test was three volts.

For certain applications, it may be desirable for improved linearity between voltage developed across the load and light spot movement to enlarge the semi-conductor body at points of contact which are 23 and 24 in FIGURE 1. Also, the nonlinearites in FIGURE 2 near the ends of the curve can be compensated for by not plating the top and bottom portions of the N layer (FIGURE 1).

A second embodiment is shown in FIGURE 3 where a semi-conductor body 35 has a P doped portion lettered P and an N doped portion lettered N which is enlarged considerably and coated with a conductive plating 36. Contacts 37 and 38 are placed on opposite sides of the P doped section and a battery 39 is connected between the contacts 37 and 38. The load is connected between conductive coating 36 and the positive terminal of battery 39. The advantage of this embodiment is that relatively large contact area plating 36, is presented for contact to potentiometer environment. The operation of this embodiment is similar to that of the embodiment shown in FIGURE 1.

A further embodiment is shown in FIGURE 4 where a semi-conductor body 40, circular in configuration, has an N doped section marked N, and a P doped section marked P with a junction 41 formed therebetween. A radial slot 42 is ultrasonically cut in body 40 and contacts 43 and 44 are formed on opposite sides of the slot. A load 46 is connected to the negative terminal of battery 45 and to a contact surface 47 which is applied to the P portion of body 40.

A light beam 48 moves in a circular path around junction 41 to vary the voltage across the load 46 in the manner described for the embodiment of FIGURE 1. The embodiment of FIGURE 4 yields larger potentiometer capability with a more compact structure and also concentrates the light spot movement along a circular path.

A further embodiment is shown in FIGURE 5 where a semi-conductor material body 50 has N type doping in the region marked N and the P type doping in the region marked P with a junction 51 therebetween and which may be made in the manner described for the embodiment of FIGURE 1. A plurality of outer contacts 52A to 52D are made to the outer circumference of N type doping annular section with each contact 52A to 52D having a corresponding contact 53A to 53D made to the P doped section of body 50. Ohmmeters 54A to 54D are placed respectively between their corresponding contact pairs.

Movement of a light spot 55 in a circular path between the outer contacts 52A to 52D and the inner contacts 53A to 53D reduces the resistance between the contact pairs so that the position of the light spot can be accurately determined by reading and recording the resistance between the contacts in each pair. The light spot 55 is shown between the contacts in pair 52A to 53A and would effectively shunt these contacts. When the light spot is between two contact pairs as it is in position 55A, each pair will have the respective resistances therebetween modified accordingly. In position 55A and with the light spot moving in a counterclockwise direction, the resistance between contacts 52C and 53C will be changed higher and the resistance between 52D and 53D will be changed lower since the spot in position 55A is closer to pair 52D to 53D than it is to 53C to 53C. If desired, a reverse bias may be placed across junction 51 to raise the barrier between the P and N sections.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described our invention, we claim:

1. A photopotentiometer comprising
a semi-conductor material having P type and N type doping with a junction being formed therebetween,
the semi-conductor material on one side of said junction being dimensioned to provide a predetermined resistance in a direction substantially parallel to said junction,
battery means being connected to said semi-conductor material on said one side of said junction along a line parallel to said junction to produce a predetermined voltage drop along said line,
a load being connected between the semi-conductor material on the other side of said junction and said battery means,
means to produce a relatively narrow beam of light movable lengthwise of said junction to successively illuminate points of said junction and have frequency components to excite the electrons sufficiently to break the electron-hole bonds and cause electron and hole flow across the junction and thus reduce the resistance at the junction point illuminated.

2. The photopotentiometer of claim 1 wherein, said load is connected to the said battery in a manner to put a reverse bias across said junction.

3. The photopotentiometer of claim 1 wherein, said junction is circular in shape thereby dividing said semi-conductor into an annular section on said one side of said junction and a circular section on said other side of said junction,
a radial slot being formed in said annular section with the opposite sides of said slot being connected to said battery, to provide said predetermined voltage drop around said annular section,
said load being connected between the center of said photopotentiometer and said battery.

4. Apparatus comprising a semi-conductor material having P type and N type doping with a junction having a barrier voltage thereacross which is subject to change when illuminated being formed therebetween,
a plurality of contacts being made to said P type section and a plurality of contacts being made to said N type section placed oppositely of said contacts in said P type section with said junction forming a light changeable barrier between opposite contacts and the semi-conductor material forming a predetermined resistance between opposite contacts,
means being connected across each contact in said P section and the oppositely placed contact in said N section to substantially continuously measure the resistance change therebetween,
means for moving a spot of light along said junction to successively illuminate points of said junction with said light having frequency components to excite the electrons sufficiently to break the electron-hole bonds and cause electron and hole flow across the junction and thus reduce the barrier voltage at the point of illumination, and with the path of current flow between opposite contacts being through the point of illumination so that the path length and hence the resistance measured between opposite contacts corresponds to the position of the light spot on said junction.

5. Apparatus comprising semi-conductor material having a section with P type doping and a section with N type doping with said sections having a predetermined resistance and with said sections having a junction therebetween having a barrier voltage thereacross which is subject to change when illuminated,
a plurality of contacts being made to said P type section and a plurality of contacts being made to said N type section placed oppositely of said contacts in said P type section with said junction forming a light changeable barrier between opposite contacts and the semi-conductor material forming a predetermined resistance between opposite contacts,
means being connected across each contact in said P section and the oppositely placed contact in said N section to substantially continuoulsy measure the resistance change therebetween,
said junction being adapted to receive a moving spot of light therealong with said light having frequency components to excite the electrons sufficiently to break the electron-hole bonds and cause electron and hole flow across the junction and thus reduce the barrier voltage at the point of illumination and with the path of current flow between opposite contacts being through the point of illumination so that the path length and hence the resistance measured between opposite contacts corresponds to the position of the light spot on said junction whereby the location of the spot of light may be determined.

6. Apparatus comprising
a semi-conductor material having P type and N type doping with a junction being formed therebetween,
the semi-conductor material on one side of said junction being dimensioned to provide a predetermined resistance in a direction substantially parallel to said junction,
voltage means being connected to said semi-conductor material on said one side of said junction along a line parallel to said junction to produce a predetermined voltage drop along said line, load means being connected between the semi-conductor material on the other side of said junction and said voltage means, said junction being adapted to receive a relatively narrow beam of light movable lengthwise therealong for successively illuminating points of said junction and having frequency components to excite the electrons sufficiently to break the electron-hole bonds and cause electron and hole flow across the junction and thus reduce the resistance at the junction point of illumination.

7. The apparatus of claim 5 with said junction being circular.

References Cited by the Examiner

UNITED STATES PATENTS

| | | | |
|---|---|---|---|
| 1,514,123 | 11/1924 | Bacevicz | 250—211 X |
| 2,879,405 | 3/1959 | Pankove | 250—211 |
| 2,892,094 | 6/1959 | Lehovec | 250—211 |
| 2,907,934 | 10/1959 | Engel | 250—211 |
| 2,984,749 | 5/1961 | Ross | 250—209 |
| 3,028,500 | 4/1962 | Wallmark | 250—211 |
| 3,033,073 | 5/1962 | Shuttleworth | 250—211 X |

OTHER REFERENCES

Electronics, vol. 34, No. 32, August 11, 1961, page 178.

RALPH G. NILSON, *Primary Examiner.*

WALTER STOLWEIN, *Examiner.*